April 1, 1969     A. K. ENGLAND     3,436,111
HANDLIFTING TOOLS
Filed May 5, 1967

INVENTOR
ARTHUR KEITH ENGLAND
BY
Woodhams, Blanchard & Flynn
ATTORNEYS

United States Patent Office 3,436,111
Patented Apr. 1, 1969

3,436,111
HANDLIFTING TOOLS
Arthur Keith England, Langdale, Jordans,
Beaconsfield, Buckinghamshire, England
Filed May 5, 1967, Ser. No. 636,425
Int. Cl. A01b *1/02, 1/22;* B25g *3/34*
U.S. Cl. 294—49      4 Claims

ABSTRACT OF THE DISCLOSURE

A hand tool such as a spade, shovel or fork for moving materials in which, in order to reduce the effort and bending required by the operator to lift a given load, the handle is offset from the plane of the blade or tines, and a strengthening stay is provided between the blade or tines and handle.

---

The invention relates to hand tools for moving materials. Such hand tools, for example, spades, shovels and forks generally have a handle meeting a blade or tines with a small bend near the lower end of the handle so that the handle near the bottom is offset by a small amount. This offset tends to prevent soiling of the lower end of the handle and allows the tool to be grasped when the top of the handle and blade are both resting on the ground.

To lift a load of material when shovelling or digging, the hand grasping the top of the tool, that is to say, the backhand, must press down to balance the weight of the load which is supported by the other hand of the operator. The force which must be exerted by the other or lifting hand to raise the tool and the load is then greater than the combined weight of tool and load by the amount of the backhand downwardly directed force. In addition, to use such tools, the operator has to bend until the lifting hand is at ground level and with a small offset the lower end of the handle still tends to become soiled.

It is an object of the invention to provide material moving hand tools in which the handle is shaped so that the lifting hand may conveniently grasp the shovel nearer the centre of gravity of the load, and in which the operator is not required to bend to the extent necessary with conventional hand tools.

According to the invention there is provided a material moving hand tool including a handle, a blade or tines secured to one end of the handle, the handle being offset from the plane of the blade or tines measured along a perpendicular from the longitudinal centre line of the handle to the plane of the blade or tines at a position adjacent the said one end of the handle, and a strengthening stay which is secured respectively to the handle at a position remote from the said one end and to the blade or tines so that the operator's hand may lie close to the centre of gravity of the load. This reduces the effort necessary to lift a given load. In addition bending by the operator is reduced, and as the lower end of the handle is much further removed from contact with the material being handled than conventional hand tools, it is less likely to be soiled. The tools may be made of a conventional material such as steel, wood, glass fibre, aluminium and the like.

The invention is diagrammatically illustrated by way of example, in the accompanying drawings in which.

Figure 1:
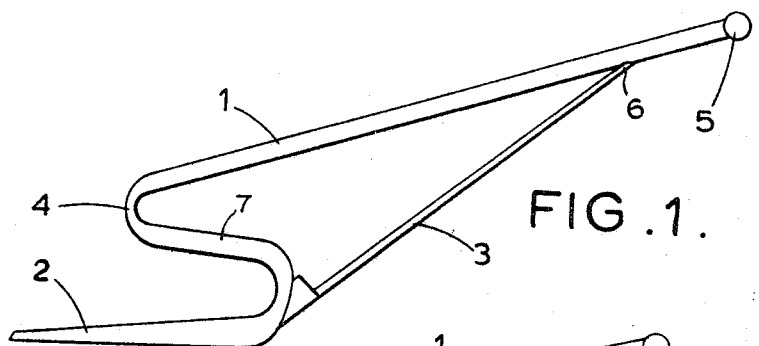
FIGURE 1 is a side elevation of a first construction according to the invention.

Referring to FIGURE 1 there is shown an elevation of a shovel in accordance with the invention, in which the handle 1 is offset by a large distance and is extended at 4 over the blade 2. A connecting member 7 is provided to connect the lower end of the handle 1 to the blade 2, while a strengthening stay 3 is provided to connect the blade to the upper end of the handle. The handle grip or T piece 5 may be of any known type.

Figure 2:
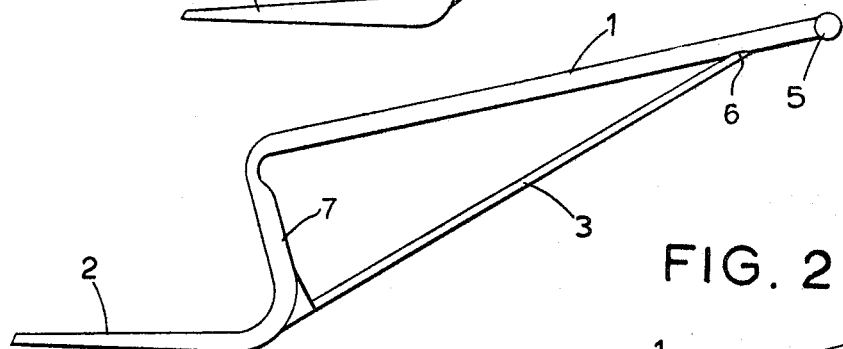
FIGURE 2 is a side elevation of a second construction according to the invention.

FIGURE 2 shows an elevation of a tool suitable for digging or shovelling, where a forward extension of the handle over the blade would be a handicap. A connecting member 7 is provided to connect the lower end of the handle 1 to the blade 2, while a strengthening stay 3 is provided to interconnect the blade and the upper end of handle.

Figure 3:
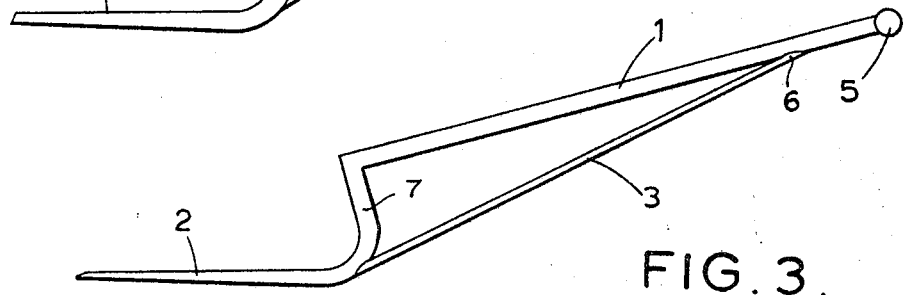
FIGURE 3 is a side elevation of a third construction according to the invention.

FIGURE 3 shows an elevation of a tool using a relatively small offset and a strengthening stay. Using a small offset may necessitate a band in the top of the stay to allow the hand to slide further along the handle without being fouled by the stay.

As clearly illustrated in FIGURES 1–3, by having the strengthening stay 3 interconnected to the handle 1 at a point near the free end 5 thereof, the operator can easily grip one end of the handle with one hand adjacent the free end 5, while the other hand grips the handle 1 in the region between the point of connection 6 and the other end of the handle to which is connected the connecting member 7. In this manner, the other hand is unobstructed in its movement along a majority of the length of the handle during usage of the hand tool since, as clearly illustrated in the drawings, the stay 3 is laterally spaced from the handle 1 by a substantial distance so as to permit the operator's hand to be freely and slideably disposed therebetween.

Further, as also illustrated in FIGURES 1–3, the connecting member 7 extends relative to the handle 1 at an angle not substantially in excess of a right angle so as to position the lower end of the handle close to the center of gravity of a load positioned on the blade means 2, thereby reducing the effort required to lift the load.

The stay strengthens the construction and prevents bending or flexing. The small offset makes the tool suitable for gardeners who wish to turn soil over, and for purposes such as concrete mixing where turning of the load is necessary. The handle is preferably offset from the plane of the blade or tines by an amount of between 2″ and 12″.

I claim:
1. A hand tool for moving material, comprising:
   an elongated handle having a cross-sectional configuration adapted to be grasped by hand and permitting a hand to be slideably moved therealong;
   blade means adapted for handling material, said blade means lying substantially within a plane which is laterally offset from one end of said handle;
   means fixedly interconnecting said blade means to said one end of said handle, the angle between said handle and said interconnecting means being substantially equal to or less than a right angle to bring said one end of said handle close to the center of gravity of a load on said blade means;
   an elongated strengthening stay interconnected between said handle and said blade means, one end of said stay being fixedly secured to said handle at a position remote from said one end of said handle wherein the point of connection of said stay to said handle is closer to the other end of said handle than it is to said one end of said handle and is adjacent the other end of said handle, the other end of said stay being fixedly interconnected to said blade means at a position laterally displaced from said one end of said elongated handle;
   said handle being adapted to be grasped by one hand adjacent the other end thereof, the other hand grasping the handle between the one end thereof and the point of connection between said handle and said stay, the distance between said stay and said handle at said one end of said handle and through the majority of the length of said handle substantially exceeding the thickness of the portion of said other hand normally disposed between said stay and handle whereby said other hand is freely slideable along the handle between the one end thereof and said point of connection during normal usage of the hand tool without the stay interfering in the free sliding movement of said other hand.

2. A hand tool as defined in claim 1, wherein said blade means comprises a blade member.

3. A hand tool as defined in claim 1, wherein said blade means comprises a plurality of tines.

4. A hand tool as defined in claim 1, wherein the one end of said handle is laterally offset from the plane of said blade means by an amount lying in the range of between two inches and twelve inches.

References Cited
UNITED STATES PATENTS

| 1,206,709 | 11/1916 | Hytrek | 294—55.5 |
| 2,318,277 | 5/1943 | Yensen | 294—49 |
| 2,704,036 | 3/1955 | Briggs | 294—49 |

FOREIGN PATENTS

| 1,067,354 | 5/1967 | Great Britain. |

RICHARD E. AEGERTER, *Primary Examiner.*

R. D. GUIOD, *Assistant Examiner.*

U.S. Cl. X.R.

294—57